(12) United States Patent
Hou et al.

(10) Patent No.: US 8,185,160 B1
(45) Date of Patent: *May 22, 2012

(54) TECHNIQUES FOR PROVIDING EFFICIENT TRANSMIT DIVERSITY AND BANDWIDTH SEGMENTATION IN A WIRELESS COMMUNICATION SYSTEM

(75) Inventors: Jason Hou, Carlsbad, CA (US); Dazi Feng, San Diego, CA (US); Sean Cai, San Diego, CA (US); Mary Chion, Belle Mead, NJ (US); Jing Wang, San Diego, CA (US)

(73) Assignee: ZTE (USA) Inc., Morristown, NJ (US)

( * ) Notice: Subject to any disclaimer, the term of this patent is extended or adjusted under 35 U.S.C. 154(b) by 720 days.

This patent is subject to a terminal disclaimer.

(21) Appl. No.: 12/194,470

(22) Filed: Aug. 19, 2008

Related U.S. Application Data

(63) Continuation of application No. 11/328,832, filed on Jan. 9, 2006, now Pat. No. 7,415,288.

(60) Provisional application No. 60/642,082, filed on Jan. 7, 2005.

(51) Int. Cl.
*H04B 1/38* (2006.01)

(52) U.S. Cl. ............... 455/562.1; 455/561; 455/101; 370/334; 375/267

(58) Field of Classification Search ........... 455/562.1, 455/561, 101; 370/334; 375/267
See application file for complete search history.

(56) References Cited

U.S. PATENT DOCUMENTS

| 6,011,787 | A  | * | 1/2000  | Nakano et al. ........... 370/335 |
| 6,167,286 | A  | * | 12/2000 | Ward et al. ............. 455/562.1 |
| 6,212,406 | B1 | * | 4/2001  | Keskitalo et al. ........ 455/562.1 |
| 6,311,075 | B1 | * | 10/2001 | Bevan et al. ............ 455/562.1 |
| 6,577,869 | B1 | * | 6/2003  | Garrison ................. 455/447 |
| 7,072,692 | B1 | * | 7/2006  | Katz et al. .............. 455/562.1 |
| 2004/0014429 | A1 | * | 1/2004 | Guo ......................... 455/73 |
| 2004/0095907 | A1 | * | 5/2004 | Agee et al. ............... 370/334 |
| 2004/0106412 | A1 | * | 6/2004 | Laroia et al. .............. 455/448 |
| 2004/0180698 | A1 | * | 9/2004 | Kamemura et al. ..... 455/562.1 |
| 2005/0286650 | A1 | * | 12/2005 | Han et al. ................ 375/267 |

OTHER PUBLICATIONS

IEEE P802.16-REVd/D5, "Part 16: Air Interface for Fixed Broadband Wireless Access Systems", pp. 1-915 (May 13, 2004).
IEEE P802.16-REVe/D5a-2004, "Amendment for Physical and Medium Access Control Layers for Combined Fixed and Mobile Operation in Licensed Bands" pp. 1-474 (Dec. 2004).
IEEE 802.16-2004, "IEEE Standard for Local and Metropolitan Area Networks, Part 16: Air Interface for Fixed Broadband Wireless Access Systems", Oct. 1, 2004, 895 pages.
IEEE 802.16e-2005, "IEEE Standard for Fixed and Mobile Broadband Wireless Access Systems, Part 16: Air Interface for Fixed and Mobile Broadband Wireless Access Systems and Amendment 2: Physical and Medium Access Control Layers for Combined Fixed and Mobile Operation in Licensed Bands and Corrigendum 1", Feb. 18, 2006, (864 pages).
Alamouti, S.M. , "A simple transmit diversity technique for wireless communications," Selected Areas in Communications, IEEE Journal, vol. 16, Iss. 8 pp. 1451-1458 (Oct. 1998).

\* cited by examiner

*Primary Examiner* — Danh Le
(74) *Attorney, Agent, or Firm* — Perkins Coie LLP

(57) ABSTRACT

Wireless communication techniques for cellular deployment of wireless communication systems with transmitters in each cell to have partially overlapped transmission patterns between two adjacent transmitters. Implementations of the described techniques can provide transmit diversity with intentional partial beam pattern overlays to improve cell sectorization or frequency re-use factor, at the same time, reduce intra-cell and inter-cell interference. Various modulations may be used in the described systems, including FDMA, TDMA, and OFDMA modulation schemes.

20 Claims, 9 Drawing Sheets

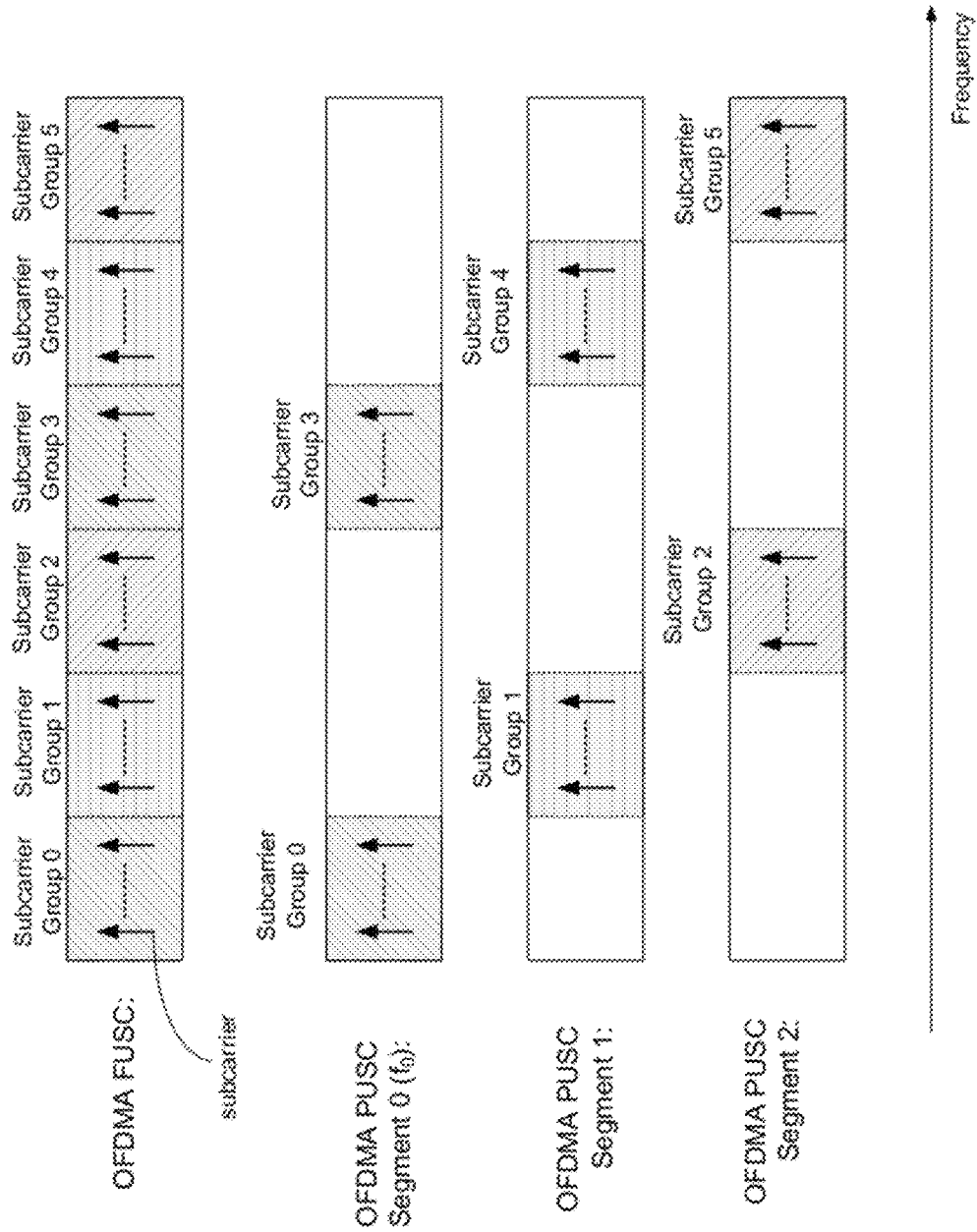

$S_n$: Transmit Main Path of Segment n, where n= 0, 1, 2.
$S_n'$: Transmit Diveristy Path of Segment n, where n= 0, 1, 2.

$M_n$ : Transmit diversity of PUSC Segment M is achieved in the region
Only main path signal of PUSC Segment n is present in the region $S_n$: Transmit regular Downlink traffic (no diversity path) in Segment n
$S_m+S_n$: Transmit regular Downlink traffic in Segment m and Segment n

TECHNIQUES FOR PROVIDING EFFICIENT TRANSMIT DIVERSITY AND BANDWIDTH SEGMENTATION IN A WIRELESS COMMUNICATION SYSTEM

CROSS-REFERENCE TO RELATED APPLICATIONS

This application is a continuation application of and claims priority to U.S. patent application Ser. No. 11/328,832, filed Jan. 9, 2006, now U.S. Pat. No. 7,415,288 which claims the benefit of U.S. Provisional Application No. 60/642,082, filed Jan. 7, 2005. The disclosure of the prior applications are considered part of (and are incorporated by reference in) the disclosure of this application.

BACKGROUND

This application relates to wireless communication devices, systems and techniques.

Various wireless communication systems use electromagnetic waves to communicate with wireless communication devices (e.g., mobile wireless phones) located within cells of coverage areas of the systems. A radio spectral range or band designated or allocated for a wireless communication service or a particular class of wireless services may be divided into different radio carrier frequencies for generating different communication frequency channels. Such systems use base stations spatially distributed to provide radio coverage in a geographic service area which is divided into cells. In such a cellular deployment, each base station (BS) is conceptually located at the center of a respective cell to provide radio coverage for that cell and transmits information to a wireless subscriber station (SS) such as a mobile SS (MSS) via BS-generated downlink (DL) radio signals. A subscriber station at a particular cell transmits information to its serving base station for that particular cell via uplink (UL) radio signals. The base stations may be designed to include directional antennas to further divide each cell into different sectors where each antenna covers one sector. This sectorization of a cell increases the communication capacity.

The capacity of wireless communications may also be increased by segmenting the communication bandwidth into different bandwidth segments for different cells and sectors. For example, in the frequency domain, Orthogonal Frequency Division Multiplexing (OFDM) and Orthogonal Frequency Division Multiple Access (OFDMA) physical layers in a cellular deployment can be used to divide the subcarriers of the uplink and downlink transmission into various orthogonal segments where each segment include multiple subcarriers. One or multiple segments can be grouped and designated for use in a sector of a cell. Because only a portion of the available subcarriers is used for communication in a sector, this use of the subcarriers is a partial use of the subchannels (PUSC). As an example, a PUSC permutation scheme is described the Partial Usage of Subchannels (PUSC) in the OFDMA physical layer (PHY) or Subchannelization in OFDM PHY defined in the IEEE 802.16-2004 and IEEE 802.16e-2005 standard documents.

FIG. 1A illustrates an OFDMA implementation of the bandwidth segmentation based on the PUSC. All available OFDMA subcarriers, all of which are used in a full use of subchannels (FUSC) scheme, are divided into different clusters or groups, e.g., groups 0 through 5. Assuming there are three segments, each segment includes one or multiple clusters of subcarriers or frequency tones but uses only part of the all available subcarriers or the total bandwidth provided in the system. This PUSC in sectors of a cell can reduce the interference. IEEE 802.16e PUSC or Subchannelization permutation scheme allows cellular deployment with a high degree of reduction in the interference at cell edges with adjacent cells and in intra-cell segment overlap areas. FIG. 1B shows a 3-sector cell based on the above signal bandwidth segment. In the cell, three antennas Ant-0, Ant-1 and Ant-2 that transmit signals at the three different frequency segments 0, 1 and 2, respectively, are used to transmit in the three sectors 0, 1 and 2, respectively. FIG. 1C further shows a 6-sector cell where 6 antennas at 6 different frequency segments are used to transmit into the 6 different sectors. Each sector of a cell can have its own set of subchannels in its frequency segment.

One technical difficulty in wireless communications is the signal fading during radio transmission from a transmitter to a receiver. Such signal fading can cause errors in reception of the signals and even lead to loss of data or failure of a communication link. One common cause for such fading is the notorious multipath fading where a signal reaches a receiver in two or more different signals paths, e.g., a direct signal and a delayed reflection from one or more objects. The fading of the signal at the receiver may be caused by, e.g., the interference of such different signals originated from the same signal from the transmitter. Transmit diversity techniques may be used to mitigate signal fading where two transmitter antennas may be used in a transmitter, e.g., the base station, to implement transmission diversity based on the space-time coding (STC). S. Alamouti described such a system to achieve a diversity of 2M using a receiver with M receiver antennas in "A simple transmit diversity technique for wireless communications" in *IEEE Journal on Select Areas in Communications*, Vol. 16, No. 8 (October 1998). A STC system can be implemented in various Multiple-Input Multiple-Output (MIMO) configurations.

FIG. 2 shows one example of a 3-sector cell that uses 2 transmitter antennas in each sector to provide the transmit diversity. The two antennas in the same sector transmit at the same signal bandwidth segment, e.g., the frequency segment 0, 1 or 2 shown in FIG. 1A and transmit the same signal of information of data with different STC codes. For example, in Sector 0, the antennas Ant-0 and Ant-3 transmit in the same frequency segment 0 with different STC codes that are represented by Segment 0 and Segment 0'. Similar notations are used in sectors 1 and 2. This cell design is equivalent to overlap of two cells where one cell has antennas Ant-0, Ant-1 and Ant-2 for the sectors 0, 1 and 2, respectively, and a second cell has antennas Ant-3, Ant-4 and Ant-5 for the sectors 0, 1 and 2, respectively. Each sector from one cell exactly overlaps with a corresponding sector in another cell that transmits the same signal of data or information at the same frequency segment under a different STC code.

SUMMARY

This application describes techniques for cellular deployment of wireless communication systems with transmitters in each cell to have partially overlapped transmission patterns between two adjacent transmitters. In some applications, the implementations of the described techniques can be adapted to enhance antenna utilization in a wireless system. In other applications, the implementations of the described techniques can be adapted to provide combination of antenna transmit diversity and cell sectorization and to enhance the system capacity and the frequency re-use efficiency.

Specific implementations of the described techniques can be used to greatly limit the number of antenna subsystems and thus the cost of transmit diversity deployment. For example, a method is described to deliver antenna transmit diversity in combination with a radio bandwidth segmentation or sectorization in a cellular mobile system to reduce the same-cell interference and to provide antenna transmit diversity. The available radio bandwidth for the system may be divided, either in frequency or in time, into non-overlapping segments which are assigned to the antennas in the same cell for transmission and reception. The antennas in the same cell are arranged so that overlaps of areas of the multiple antenna patterns are interference mitigated due to the disjoint assignments of segments or sectors either in frequency of time and, in overlapped areas, antenna transmit diversity is established in a joint transmission of multiple antennae from the aggregate segments or sectors.

In the above example, the radio bandwidth segmentation or sectorization may be implemented in various forms, such as contiguous frequency division of the bandwidth such as in Frequency Division Multiple Access (FDMA), time division transmission system such as Time Division Multiple Access (TDMA), or a permuted carrier tone division both in time and frequency such as Orthogonal Frequency Division Multiplexing (OFDM) and Orthogonal Frequency Multiple Access (OFDMA) systems. Various techniques may be applied to achieve transmit diversity or transmit capacity. For example, the Space Time Transmit Diversity (STTD) and Space Time Coding (STC) may be applied in the transmission paths of multiple antennae of the overlap area belonging to different segments or sectors, thereby delivering transmit diversity gain; a multicarrier transmission on each antenna subsystem such as frequency planning may be applied in the transmission paths of multiple antennae of the overlap area belonging to different segments or sectors, thereby delivering addition transmit capacity gain; a Frequency Transmit Diversity (FTD) such as the Frequency Hoping Diversity Coding (FHDC) is applied in the transmission paths of multiple antennae of the overlap area belonging to different segments or sectors, thereby delivering transmit diversity gain; and Multiple-Input Multiple-Output (MIMO) mechanisms, including both Open-Loop and Closed-Loop MIMO, and such as Spatial Multiplexing (SM) schemes are applied in the transmission paths of multiple antennae of the overlap area belonging to different segments or sectors, thereby delivering transmit diversity gain. In addition, a directional antenna may be used in each segment or sector to achieve intentional antenna pattern overlaps with adjacent antennas and spatial multiplexing so that overlap areas are interference free and provide antenna transmit diversity. In addition, frequency reuse can be maintained with the antenna sectorization. Furthermore, channel estimation can be provided in aiding receiver demodulation of transmit diversity of the overlapping segments in the presence of training symbols specific to each segments.

This application also describes implementations of cellular wireless communication systems. In one example, a system includes base stations spatially distributed to define radio cells to wirelessly communicate with wireless subscriber stations in each cell. In this system, each base station corresponds to one cell and includes radio transmitters that are spatially arranged relative to one another to partially overlap a transmission pattern of one radio transmitter with (1) a transmission pattern of a first adjacent radio transmitter on one side of the radio transmitter and (2) a transmission pattern of a second adjacent radio transmitter on the other side of the radio transmitter to form two overlapped regions as two separate sectors of the cell. Such overlapping forms a number of sectors of the cell that is equal to a number of the radio transmitters. A transmission circuit is also included in this system to supply a set of different radio bandwidth segments to the radio transmitters. Two adjacent radio transmitters are assigned to transmit at different radio bandwidth segments, and two radio transmitters that produce two transmission patterns located at opposing sides of the cell without overlap are assigned with the same radio bandwidth segment.

In the above system, when the transmit diversity is desired, the transmission circuit may be adapted to operate each radio transmitter to transmit at a radio bandwidth segment assigned to another radio transmitter to provide transmit diversity in each sector. In one implementation, the transmission circuit includes transmitter circuits coupled to supply transmission signals to the radio transmitters, respectively. As a more specific example, each transmitter circuit can include a transmitter signal generator to generate a transmission signal in a radio bandwidth segment assigned to a radio transmitter corresponding to the transmitter circuit. A transmission diversity encoder is also included to generate, from the transmission signal, a main path transmission signal at the assigned radio bandwidth segment for the radio transmitter to transmit and a diversity transmission signal at a different radio bandwidth segment to supply to a different radio transmitter assigned with the different radio bandwidth segment. The transmission circuit also includes a signal combiner to combine another diversity transmission signal at a second different radio bandwidth segment assigned to a second different radio transmitter and the main path transmission signal into an output transmission signal for the radio transmitter to transmit.

These and other implementations, variations and modifications are described in greater details in the attached drawings, the detailed description and the claims.

BRIEF DESCRIPTION OF THE DRAWINGS

FIG. 1A illustrates bandwidth segmentation based on the partial use of the subchannels in OFDMA or OFDM, where each segment includes one or multiple clusters of OFDMA (or OFDM) tones.

DETAILED DESCRIPTION

Figure 1C:
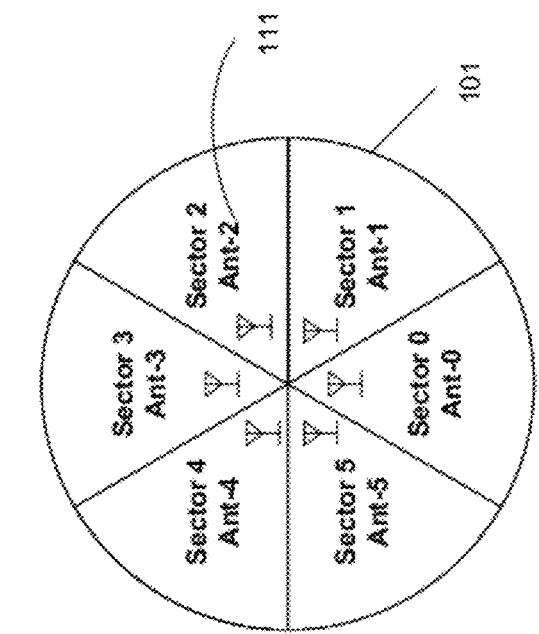
FIGS. 1B and 1C show examples of a 3-sector cell and a 6-sector cell based on the segmentation in FIG. 1A without transmit diversity.
Figure 1C:
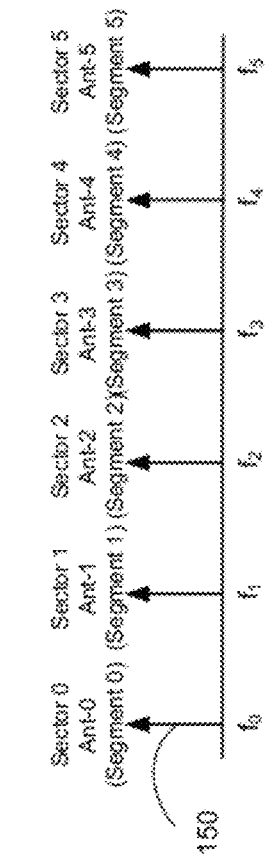
Figure 1B:
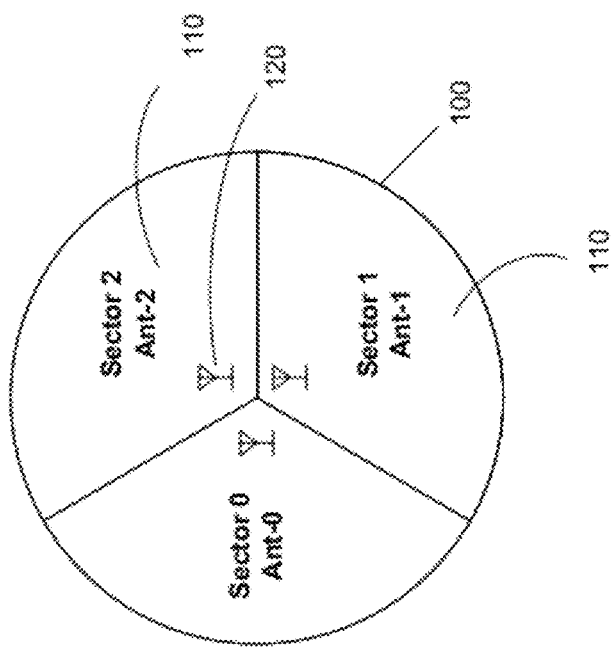
Figure 1B:
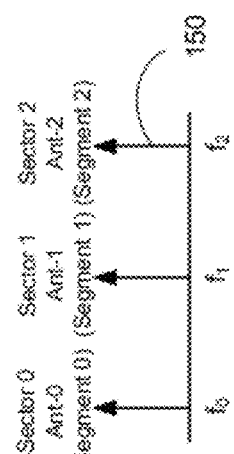
Figure 2:
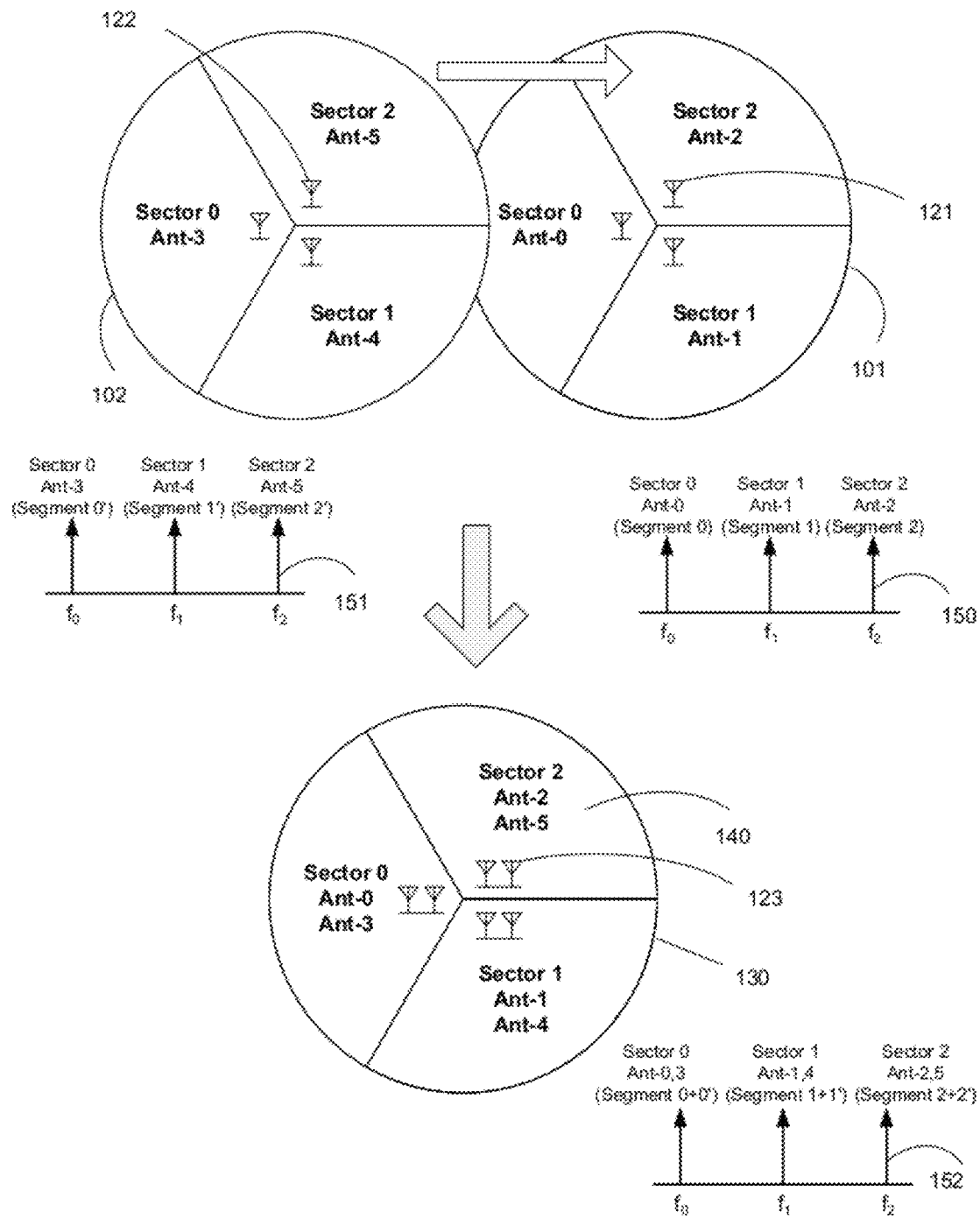
FIG. 2 shows an example of a 3-sector cell deployment with 2 times transmit diversity where two transmitter antennas are used to cover each sector of the cell.

Referring back to FIG. 1A, a non-sectorized cell in a Full Usage of Subchannels (FUSC) scheme uses a single antenna to transmit all subchannels in the cell. In a 3-sector cell under the PUSC scheme in FIG. 1B, three separate antenna subsystems with three transmitter antennas and three corresponding transmitter circuits are used for three different sectors within a single cell. Under this design with 3 frequency segments for 3 sectors, the illustrated 3-segment PUSC requires three antenna subsystems to operate without the spatial transmit diversity (spatial multiplexing). The number of antenna subsystems increases with the number of sectors and the number of frequency segments. If the transmit diversity is added to the cell, the number of antenna subsystems further increases with the degree of the transmit diversity. For a double transmit diversity where the same data or information is transmitted by two antenna subsystems under two different STC codes, the number of the antenna subsystems in the cell in FIG. 2 is doubled from that used in the cell in FIG. 1B. The equipment for such antenna subsystems is often expensive. In actual deployments of communication systems, it is desirable to reduce the number of antenna subsystems while maintaining the desired system capacity and performance against signal fading and interference.

The techniques described in this application can be implemented to use two sets of transmitters or antenna subsystems in each cell that are spatially interleaved between the two sets to combine antenna transmit diversity, cell sectorization scheme, and bandwidth segmentation to reduce the number of transmitters or antenna subsystems, to reduce interference and signal fading, and to improve the frequency re-use efficiency.

In some implementations, a wireless communication system can be designed to provide a cellular-like cell structure to utilize radio bandwidth segmentation to mitigate interference in antenna pattern overlaps, and to deliver transmit antenna diversity in the overlap areas. The bandwidth segmentation, which may also be referred to as radio resource allocation, divides the available radio bandwidth into different bandwidth segments in the frequency domain, in the time domain, or in a combination of both frequency and time. The bandwidth segments are assigned to the sectors within a cell and thus can be referred to as sector bandwidth segments. In implementations described in this application, two adjacent or partially overlapped sectors are assigned with different bandwidth segments to reduce interference. One sector bandwidth segment may be assigned to two non-adjacent or non-overlapped sectors to allow for segment reuse within each cell to increase the radio resource utilization. Examples of bandwidth segmentation includes, among others, contiguous frequency division of used bandwidth such as in Frequency Division Multiple Access (FDMA), or time division transmission system such as Time Division Multiple Access (TDMA), or permuted carrier tone division both in time and frequency such as Orthogonal Frequency Multiple Access (OFDMA) systems. The specific implementations described below are for OFDMA systems as examples and thus the bandwidth segmentation divides the all OFDMA subcarriers into groups or clusters of subcarriers as sector frequency bands.

Therefore, a system may be implemented to include base stations spatially distributed to define radio cells to wirelessly communicate with wireless subscriber stations in each cell. Each base station corresponds to one cell and includes radio transmitters that are spatially arranged relative to one another to partially overlap a transmission pattern of one radio transmitter with (1) a transmission pattern of a first adjacent radio transmitter on one side of the radio transmitter and (2) a transmission pattern of a second adjacent radio transmitter on the other side of the radio transmitter to form two overlapped regions as two separate sectors of the cell. Such overlapping forms a number of sectors of the cell that is equal to a number of the radio transmitters. A transmission circuit is also included in this system to supply a set of different radio bandwidth segments to the radio transmitters. Two adjacent radio transmitters are assigned to transmit at different radio bandwidth segments, and two radio transmitters that produce two transmission patterns located at opposing sides of the cell without overlap are assigned with the same radio bandwidth segment.

In one example, a wireless communication system can include a network of base stations spatially distributed to define radio cells to wirelessly communicate with wireless subscriber stations (i.e., wireless communication devices) in each cell. Each base station corresponds to one cell and includes two sets of radio transmitters to divide the cell into sectors. A set of first group radio transmitters is provided to divide the cell into a set of first group sectors with one first group radio transmitter per one first group sector. A set of second group radio transmitters is also provided to divide the same cell into a set of second group sectors with one second group radio transmitter per one second group-sector. The second group sectors are equal in number and in size to the first-group-sectors. The first and second group sectors do not overlap over each other with each first group sector exactly overlapping a corresponding second group sector like the cell of the transmit diversity design in FIG. 2. Here, the second group sectors are spatially shifted from and spatially interleaved with the first group sectors so that each first group sector spatially overlaps with two adjacent second group sectors and vice versa. A transmission circuit is included in the base station for each cell to supply a set of sector radio sector frequency bands to the set of first group radio transmitters, respectively, to transmit to the set of first group sectors, respectively. Two adjacent first group sectors are assigned with different sector frequency bands to reduce interference. The transmission circuit also supplies the same set of sector radio frequency bands to the set of second group radio transmitters, respectively, to transmit to the set of second group sectors, respectively. Two adjacent second group sectors are assigned with different sector frequency bands to reduce interference. The assignment of the different sector radio frequency bands is made in a manner that a first group sector and a second group sector that are assigned with the same sector radio frequency band are spatially separate from each other without overlap. The radio frequency band assigned to a first group sector that spatially overlaps with two adjacent second group sectors is different from the two radio frequency bands assigned to the two adjacent second group sectors. This overlap of antenna patterns can reduce or minimize the interference based on the associated frequency assignment to the first and second group sectors.

In this implementation, the transmission circuit further supplies each first group radio transmitter to transmit at a sector radio frequency band assigned to a first group radio transmitter at one adjacent first group sector to provide transmit diversity for the one adjacent first group sector, and supplies each second group radio transmitter to transmit at a sector radio frequency band assigned to a second group radio transmitter at one adjacent second group sector to provide transmit diversity for the one adjacent second group sector. Hence, in the overlapped area of a first group transmitter and a second group transmitter, there are four different signals but only two out of the four signals are for the communications in that overlapped area.

The above cell design divides the cell into 2N number of sectors with 2N radio transmitters or antenna subsystems where N is the number of the first group radio transmitters. Similar to the cell design shown in FIG. 1B, this design has one radio transmitter per sector. Different from the cell design in FIG. 1B, this design provides transmit diversity in each sector and, in this regard, is similar to the cell design in FIG. 2. However, this cell design is different from the cell design in FIG. 2 because this design has only one radio transmitter, rather than two, per sector and yet still provides the desired transmit diversity in each sector.

Figure 3:
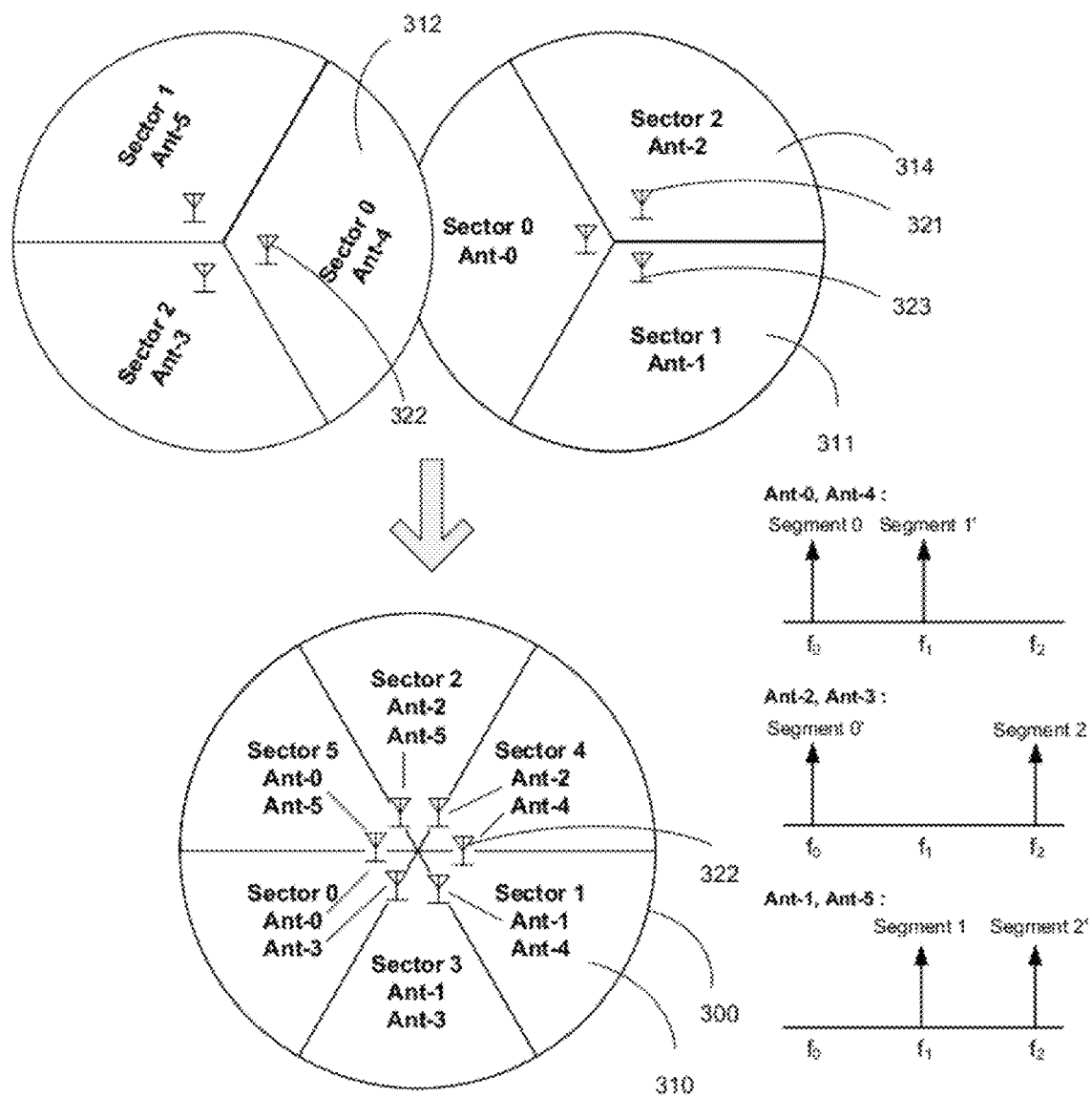
FIGS. 3 and 4 illustrate an example of a cell with 6 antennae to create an effective 6-sector cell deployment with 2 times transmit diversity in each sector, where each sector is an overlap region of two different transmission patterns of two different antennas.

FIG. 3 illustrates an example of a 6-sector cell using 6 antennae (Ant-0 through Ant-5) to create an effective 6-sector cell 300 deployment with 2 times transmit diversity 310. The 6 antennas are divided into two sets. The first set includes 3 antennas Ant-0, Ant-1 and Ant-2 that divide the cell into 3 first group sectors. The second set includes 3 antennas Ant-3, Ant-4 and Ant-5 that divide the cell into 3 second group sectors that are different from the 3 first group sectors.

Notably, the first group sectors and second group sectors are shifted in position to overlap one first group sector with parts of two adjacent second group sectors. This is different from the overlaying the second beam 122 on top the first beam 121 in the same segment in order to provide transmit spatial diversity 123, shown in FIG. 2. The overlapping in FIG. 3 overlaps the second beam 322 on top of the border region of two adjacent sectors of antenna 321 and 323. This arrangement can double the number of effective sectors 310 to increase the capacity of the overall cell 300 without increasing the total number of antennas. In addition, the overlaps of antenna patterns are designed to allow the sectors defined by two antennas assigned with the same main path signal frequency segment to be on opposing sides of the cell without overlap with each other. For example, the sector defined by Ant-4 and the sector defined by Ant-0 are such two sectors. This overlap arrangement provides for the 2× frequency reuse in each cell while maintaining the condition that two adjacent or overlapped sectors are assigned with different sector frequency bands to reduce interference. Assignments of the sector frequency bands in adjacent cells can also be configured to reduce the interference between sectors of different adjacent cells while providing frequency reuse in adjacent cells.

In another aspect of the design, each of the 6 antennas transmits two signals, one signal for the corresponding sector for the antenna and another one for the transmit diversity of an adjacent sector. For example, Antennas Ant-0 and Ant-4 are assigned to transmit in their respective sectors in the same frequency segment 0 ($f_0$). In addition, they also transmit the diversity signal in another frequency segment 1 ($f_1$) assigned to an adjacent sector and the diversity signal is denoted as Segment 1'. Similarly, the antennas Ant-2 and Ant-3 transmit downlink traffic in Segment 0' and Segment 2 ($f_0 + f_2$), and the antenna Ant-1 and Ant-5 transmit downlink traffic in Segment 1 and Segment 2' ($f_1 + f_2$). Therefore, Sector 0 of cell 300 can achieve the transmit diversity (TD) in Segment 0+0' at $f_0$ with the antenna Ant-0 and antenna Ant-3. In a similar manner, TD can be achieved in Segment 0+0' for Sector 4, in Segment 1+1' for Sectors 1 and 5, and in Segment 2+2' for Sectors 2 and 3. The transmit diversity achieved in FIG. 3 is different from the transmit diversity in FIG. 2 and is called hybrid transmit diversity (HTD) because the transmit diversity is achieved via both bandwidth segmentation and partial overlap of antenna patterns.

Figure 4:
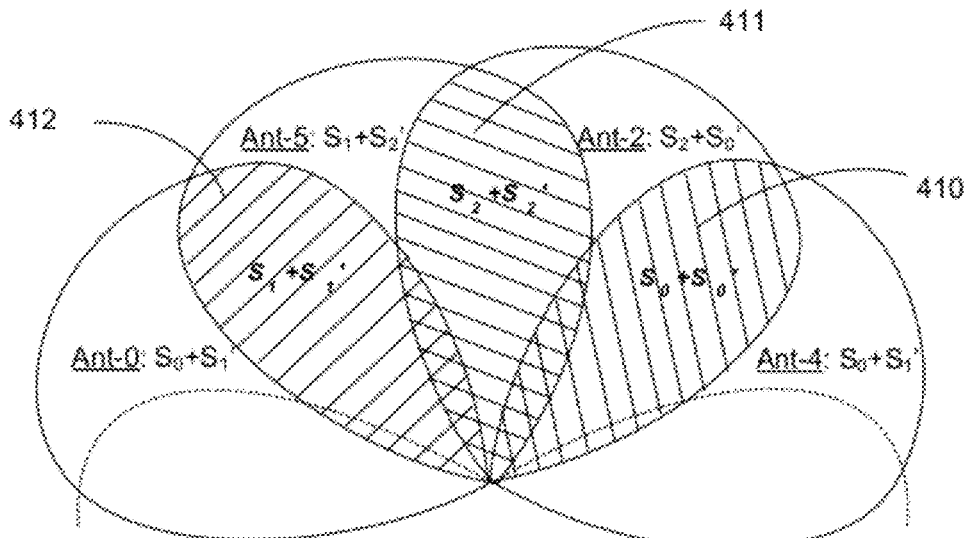
Figure 4:
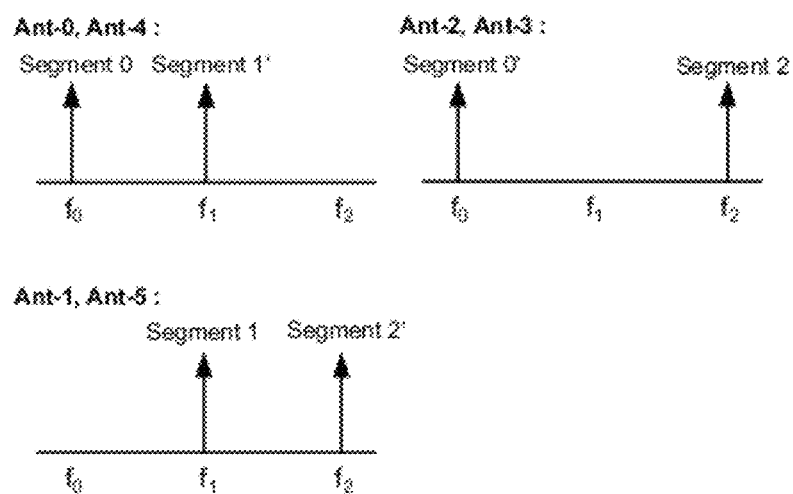

FIG. 4 further illustrates details of the antenna pattern overlap regions in the HTD-PUSC scheme in FIG. 3. The overlap regions 410, 411, 412 form effective sectors 310 as shown in FIG. 3. The OFDMA PUSC is an effective approach to reducing cell interference but it does not provide spatial multiplexing in the transmit diversity to mitigate signal fading. In addition, OFDMA PUSC requires additional antenna subsystems in comparison to FUSC deployment and can be expensive to implement. The HD-PUSC shown in FIGS. 3 and 4 explores the benefits of both the transmit diversity and OFDMA PUSC sectorization by leveraging the orthogonality of signals of different segments in the PUSC mode to allow transmission by each sector in one or multiple segments and by using intentional overlaps of antenna patterns to achieve the transmit diversity in the overlap zones. Overlaps of antenna patterns belonging to different segments do not introduce interference to the current serving segment. To further improve link quality and coverage, MIMO/STC technology can be deployed at the base station (BS).

Figure 5:
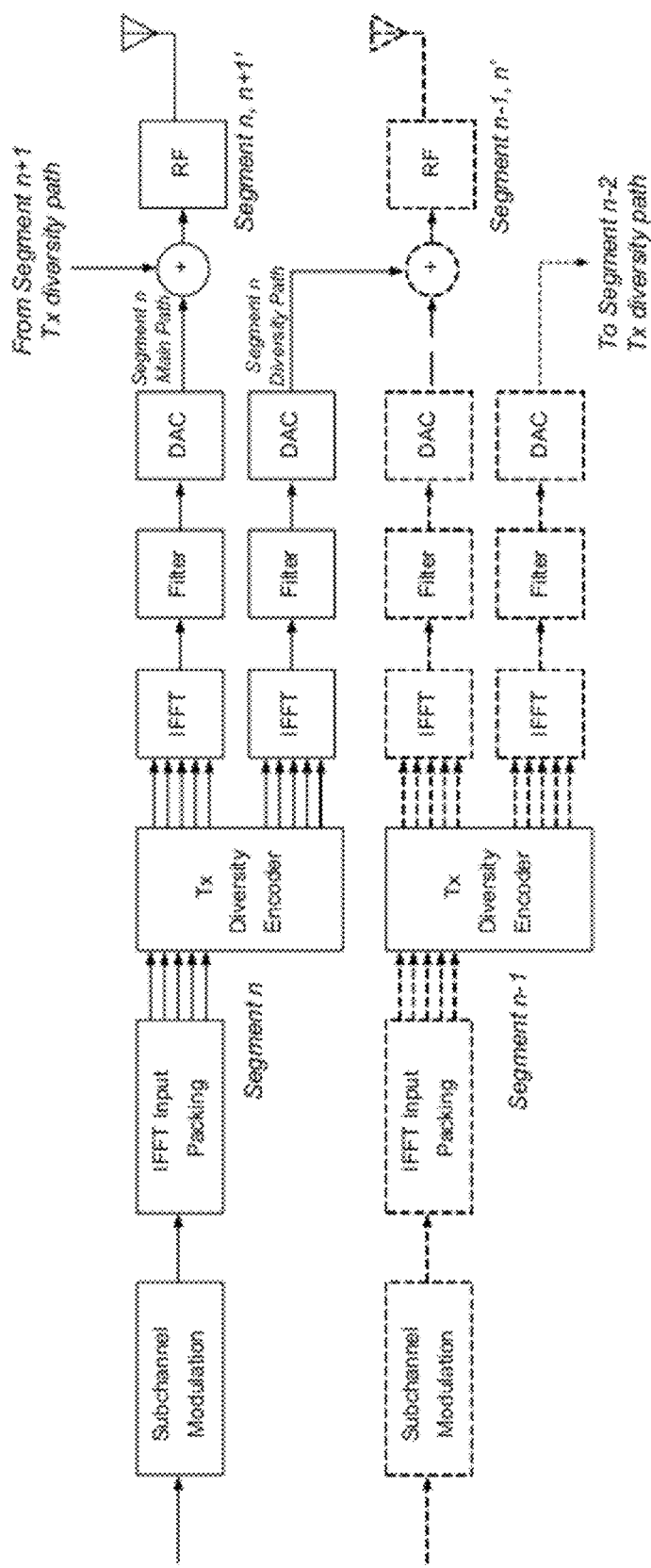
FIG. 5 shows an example of a block diagram of a transmitter circuit for a base station in a cell based on the design in FIGS. 3 and 4.

FIG. 5 shows an example of the transmission circuit for each radio transmitter or antenna subsystem of a base station (BS) for the design in FIGS. 3 and 4 for the transmit diversity in the OFDMA PUSC permutation. Referring back to the 3-sector cell exemplary design in FIG. 3, two sets of radio transmitters in the cell are used and are spatially interleaved to define the effective sectors. Each transmitter includes a sector transmitter circuit coupled to supply the two transmission signals in two different frequency segments. Each transmitter circuit includes a transmitter signal generator to generate a transmission signal in a sector radio frequency band assigned to the radio transmitter corresponding to the transmitter circuit. In FIG. 5, this signal generator includes a subchannel modulation unit and an inverse fast Fourier transform (IFFT) input packing unit. The transmitter circuit also includes a transmission diversity encoder to generate a sector transmission signal (e.g., the upper path signal in FIG. 5) at the assigned sector radio frequency band for the radio transmitter to transmit to a corresponding sector of the radio transmitter and a sector diversity transmission signal (e.g., the lower path signal in FIG. 5) at a different sector radio frequency band to supply to a radio transmitter in an adjacent sector. Each path of the two signals includes an IFFT unit, a filter and a digital-to-analog converter (ADC). A signal combiner is provided to combine another sector diversity transmission signal at a second different radio frequency band for another radio transmitter in a second adjacent sector and the sector transmission signal into a final transmission signal for the radio transmitter to transmit. Hence, each transmitter circuit has a main path and a diversity path to provide two versions of the same initial signal.

The above implementation of the transmitter circuit design for the HTD-PUSC scheme does not add complexity to the BS hardware implementation. The overall design reduces the number of RF antenna subsystems in comparison to the transmit diversity design in FIG. 2 and thus provides saving in equipment cost.

Figure 6:
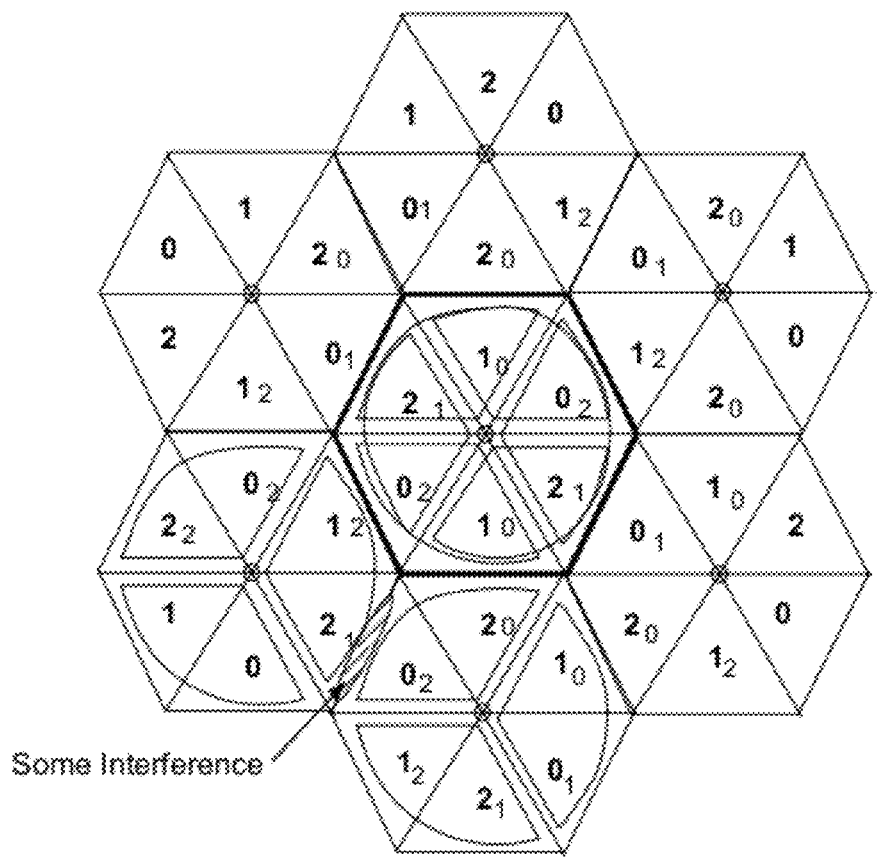
FIG. 6 shows an example of cell planning using 6-segment PUSC cells and 2× transmit diversity with 2× spatial reuse.

FIG. 6 shows an example of the frequency reuse in each cell and in adjacent cells in a cellular deployment utilizing the above HTD-PUSC scheme. This example uses 6 PUSC sectors per cell to achieve 2× spatial reuse. The 2× transmit diversity is achieved by the overlaps of antenna patterns without adding additional antenna subsystems that are specific to the transmit diversity as in FIG. 2. Referring back to FIG. 3, the overlaps of antenna patterns are designed to allow the sectors defined by two antennas assigned with the same main path signal frequency segment to be on opposite sides of the cell without overlap with each other. This overlap arrangement provides for the 2× frequency reuse in each cell. Without HTD-PUSC scheme and introducing 2× transmit diversity, the required antenna subsystems would have been 12 instead of 6 as shown. The large number represents the frequency segment number of the main path signal for the sector and the number in the subscript represents the frequency segment number of the diversity path signal in that sector.

The theoretical capacity of the 6-sector PUSC cell is equivalent to 2 times of Full Usage of Subchannel (FUSC) deployment or 2 sectors of FUSC per cell. To achieve a 2× transmit diversity, the minimum number of antenna subsystems is 4 in this particular example. With this minimum number of antennas, the interference level introduced by the FUSC permutation at cell edges and the overlap areas by adjacent antenna patterns within the same cell can be excessive to some applications and the intra-cell interference by adjacent sectors is likely to pose the biggest problem because of the strong interferers. Reducing the antenna overlap can mitigate the interference problem but can also introduce another problem of dead zones for the service coverage. The example in FIG. 6 implements additional two antenna subsystems to have a total of 6 antenna subsystems so that the intra-cell and inter-cell interference can be significantly reduced by choosing the application of HTD-PUSC scheme in a cellular network deployment.

Figure 7:
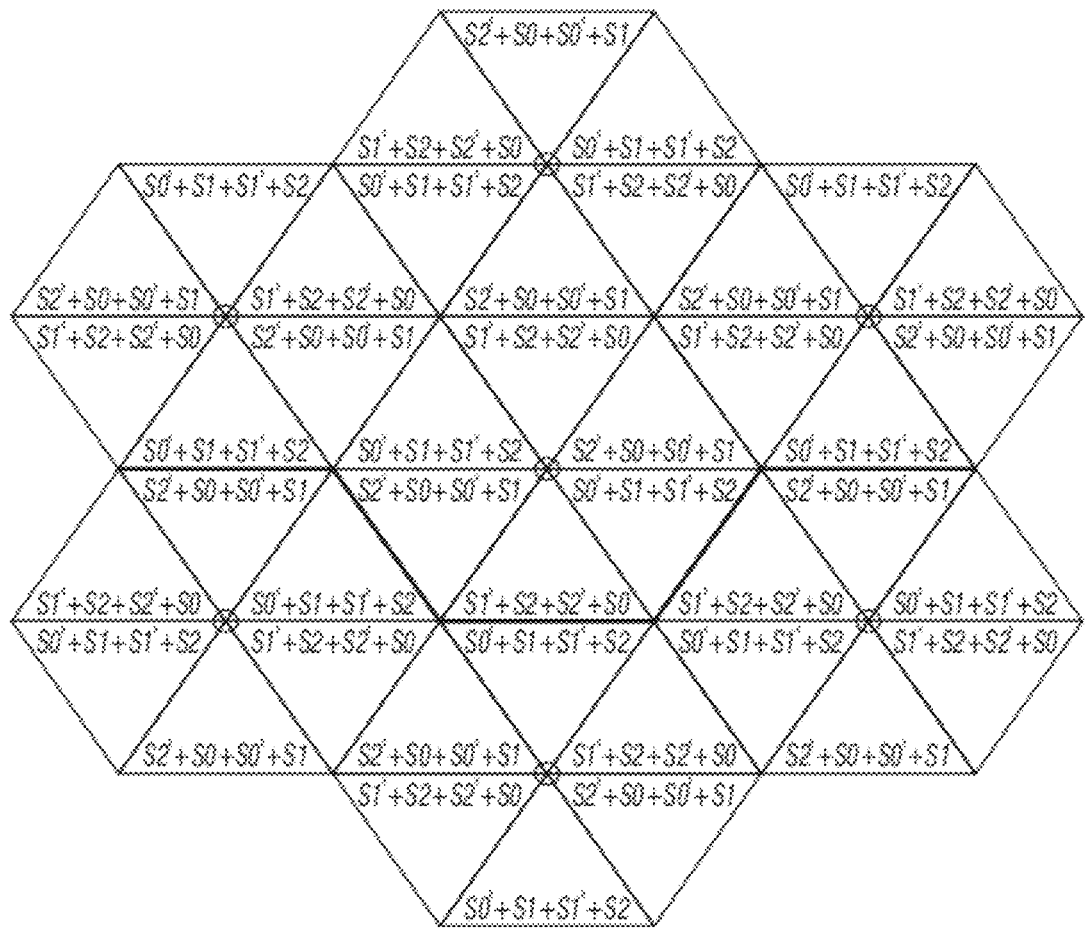
FIG. 7 shows an interference map of the 6-segment cell deployment based on the design in FIGS. 3 and 4.

FIG. 7 presents the interference map of the 6-sector deployment in Space-Time Coding (STC) zones. As shown, along the edges within the same cell, the STC transmission and reception is interference free. This type of interference is often the greatest and difficult to remove if PUSC-like bandwidth segmentation techniques are not used. At cell edges between cells, same-frequency interference is at least 3 dB lower in flat fading because of an additional transmit diversity path.

Figure 8:
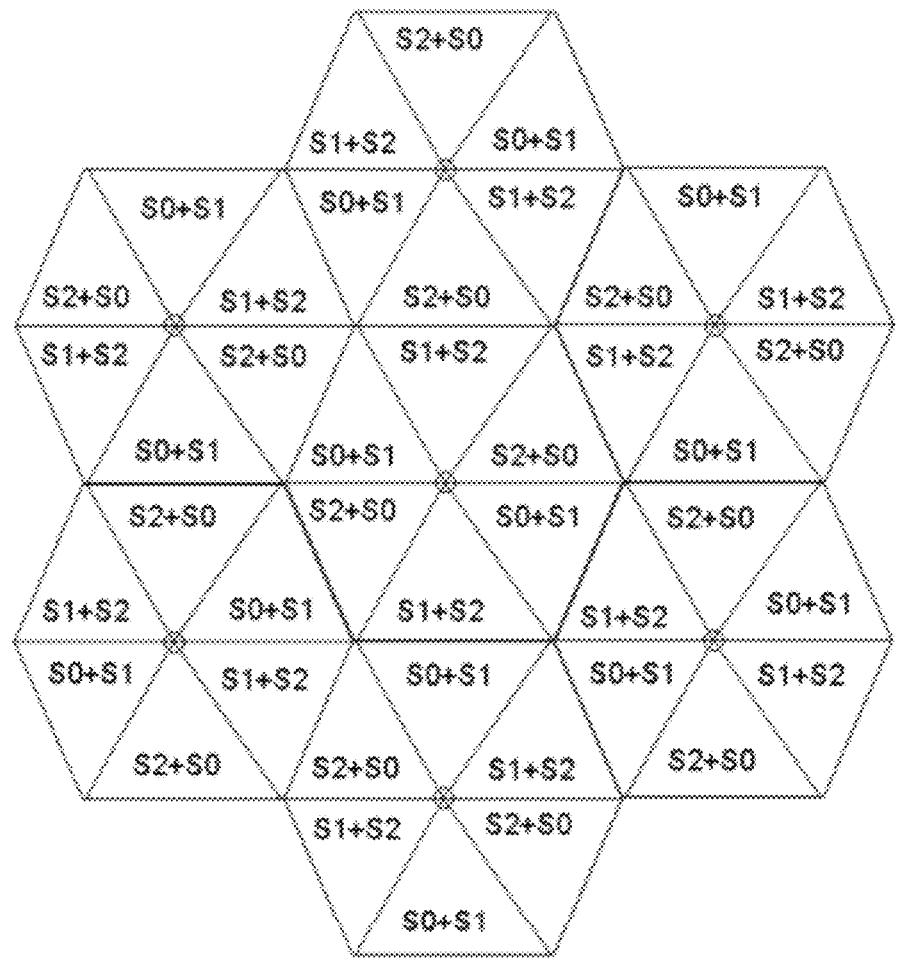
FIG. 8 shows an interference map of the same cell design in FIG. 7 without the transmit diversity feature.

FIG. 8 is an interference map of the above 6-segment HTD-PUSC deployment in non-STC zones where the diversity path signal is removed and each antenna simply transmits at its assigned frequency segment. The overlap arrangement of the antenna patterns in FIG. 8 is the same as that in FIGS. 3 and 7 by placing the sectors defined by two antennas assigned with the same main path signal frequency segment to be on opposite sides of the cell without overlap with each other. In the non-STC zones, two out of three sectors can be interference free, thereby creating a deployment model where seamless coverage can be very well maintained and at the same time transmit diversity can be utilized at a modest increase of the number of antenna subsystems.

In the current IEEE802.16e, the channel estimation of the MIMO/STC path is derived solely from pilot symbols unless MIMO/STC midamble is added to the down ink. Adding MIMO/STC midamble has an undesirable effect of taking symbols away from DL traffic capacity while using pilot for channel estimation requires that mobile adds a good amount of symbol memory buffers and computation complexity in interpolating estimation results. Additionally, the current STC pilot structure can only cope with maximum RF delay spread of 4 us. The present HTD-PUSC scheme can be used to provide a mechanism for deriving channel estimation from sector/segment preambles.

Only a few implementations are described. Variations and enhancements of the described implementations and other implementations may be possible.

What is claimed is:

1. A method for cellular wireless communication, comprising:
providing in each cell a set of first group radio transmitters that divide the cell into a set of first group sectors with one first group radio transmitter per first group sector;
providing in each cell a set of second group radio transmitters that divide the cell into a set of second group sectors with one second group radio transmitter per second group sector, wherein the set of second group sectors are equal in number and in size to the set of first group sectors;
arranging the first and the second radio group transmitters in each cell to overlap the first and second group sectors in a manner that the first group sectors are spatially shifted from and spatially interleaved with the set of first group sectors so that each first group sector spatially overlaps with two adjacent second group sectors and vice versa;
assigning a set of sector radio bandwidth segments to the set of first group radio transmitters, respectively, to transmit to the set of first group sectors, respectively, wherein two adjacent first group sectors are assigned with different sector radio bandwidth segments;
assigning the set of sector radio bandwidth segments to the set of second group radio transmitters, respectively, to transmit to the set of second group sectors, respectively, wherein two adjacent second group sectors are assigned with different sector radio bandwidth segments, and a first group sector and a second group sector that are assigned with the same sector radio bandwidth segment are spatially separate from each other without overlap;
further operating each first group radio transmitter to transmit at a sector radio bandwidth segment to provide transmit diversity for a second group sector in the overlapped area of the two sectors; and
further operating each second group radio transmitter to transmit at a sector group radio bandwidth segment to provide transmit diversity for a first group sector in the overlapped area of the two sectors.

2. A method as in claim 1, wherein the set of sector radio bandwidth segments includes groups of subcarriers under an Orthogonal Frequency Division Multiplexing (OFDM) or Orthogonal Frequency Division Multiple Access (OFDMA) technology, and wherein the method further comprises assigning a portion of subchannel carriers under either OFDM or OFDMA to each sector radio bandwidth segment as a sector frequency band.

3. A method as in claim 1, wherein the set of sector radio bandwidth segments are based on a frequency division of an available frequency bandwidth for the cellular wireless communication.

4. A method as in claim 3, wherein the contiguous frequency division of an available frequency bandwidth is Frequency Division Multiple Access (FDMA).

5. A system as in claim 4, wherein a first group sector and a second group sector that are assigned with the same sector radio bandwidth segment are spatially separate from each other and located at opposing sides of the cell without overlap.

6. A method as in claim 3, further comprising assigning multicarrier transmission on each radio transmitter.

7. A method as in claim 1, wherein the set of sector radio bandwidth segments is according to a time division of an available frequency bandwidth for the cellular wireless communication.

8. A method as in claim 7, wherein the set of sector radio bandwidth segments is according to a Time Division Multiple Access (TDMA) technology.

9. A cellular wireless communication system, comprising:
a plurality of base stations spatially distributed to define radio cells to wirelessly communicate with wireless subscriber stations in each cell,
wherein each base station corresponds to one cell and comprises:
a set of first group radio transmitters that divide the cell into a set of first group sectors with one first group radio transmitter per first group sector;
a set of second group radio transmitters that divide the cell into a set of second group sectors with one second group radio transmitter per second-group-sector, wherein the set of second group sectors are equal in number and in size to the set of first group sectors, and are spatially shifted from and spatially interleaved with the set of first group sectors so that each first group sector spatially overlaps with two adjacent second group sectors and vice versa; and a transmission circuit to supply a set of sector radio bandwidth segments to the set of first group radio transmitters, respectively, to transmit to the set of first group sectors, respectively, and to supply the set of sector radio bandwidth segments to the set of second group radio transmitters, respectively, to transmit to the set of second group sectors, respectively, in a manner that, two adjacent or overlapped sectors are assigned with different sector radio bandwidth segments and a first group sector and a second group sector that are assigned with the same sector radio bandwidth segment are spatially separate from each other without overlap.

10. A system as in claim 9, wherein the transmission circuit is adapted to operate each first group radio transmitter to transmit at a sector radio bandwidth segment to provide transmit diversity for a second group sector that partially overlaps with a first group sector of the first group radio transmitter in an overlapped region of the first and the second group sectors, and operates each second group radio transmitter to transmit at a sector radio bandwidth segment to provide transmit diversity for a first group sector that partially overlaps with a second group sector of the second group radio transmitter in an overlapped region of the first and second group sectors.

11. A system as in claim 10, further comprising a mechanism in the transmission circuit to cause each of the first and second group radio transmitters to transmit according to a Space Time Transmit Diversity (STTD), Space Time Coding (STC).

12. A system as in claim 10, wherein the first and second transmitters and in the transmission circuit are adopted as a Multiple-Input Multiple-Output (MIMO) system.

13. A system as in claim 12, wherein the MIMO system is an open-loop MIMO.

14. A system as in claim 12, wherein the MIMO system is a closed-loop MIMO.

15. A system as in claim 10, further comprising a mechanism to provide channel estimation in aiding receiver demodulation of transmit diversity in each region where a first group sector and a second group sector overlap.

16. A system as in claim 10, wherein the transmission circuit of each base station further comprises:
a plurality of sector signal generator circuits coupled to supply transmission signals for both first group and second group radio transmitters, wherein each sector signal generator circuit comprises:
a sector main signal generator to generate a main transmission signal in a sector radio bandwidth segment for a sector assigned with the sector radio bandwidth segment, a sector diversity encoder to generate a sector diversity transmission signal for the sector assigned with the radio bandwidth segment, and a signal combiner to combine the sector diversity transmission signal for another sector which generated from the diversity signal generator of the corresponding sector signal generator circuit and the sector main transmission signal into a final transmission signal.

17. A system as in claim 9, further comprising a mechanism in the transmission circuit to cause each of the first and second group radio transmitters to transmit according to a Frequency Transmit Diversity (FTD), Frequency Hoping Diversity Coding (FHDC).

18. A cellular wireless communication system, comprising:
a plurality of base stations spatially distributed to define radio cells to wirelessly communicate with wireless subscriber stations in each cell,
wherein each base station corresponds to one cell and comprises:
a plurality of radio transmitters that are spatially arranged relative to one another to partially overlap a transmission pattern of one radio transmitter with (1) a transmission pattern of a first adjacent radio transmitter on one side of the radio transmitter and (2) a transmission pattern of a second adjacent radio transmitter on the other side of the radio transmitter to form two overlapped regions as two separate sectors of the cell, thus forming a number of sectors of the cell that is equal to a number of the radio transmitters; and
a transmission circuit to supply a set of different radio bandwidth segments to the radio transmitters, wherein two adjacent radio transmitters are assigned to transmit at different radio bandwidth segments, and wherein two radio transmitters that produce two transmission patterns located at opposing sides of the cell without overlap are assigned with the same radio bandwidth segment.

19. A system as in claim 18, wherein the transmission circuit is adapted to operate each radio transmitter to transmit at a radio bandwidth segment assigned to another radio transmitter to provide transmit diversity in each sector.

20. A system as in claim 19, wherein the transmission circuit comprises a plurality of transmitter circuits coupled to supply transmission signals to the radio transmitters, respectively, wherein each transmitter circuit comprises:
a transmitter signal generator to generate a transmission signal in a radio bandwidth segment assigned to a radio transmitter corresponding to the transmitter circuit,
a transmission diversity encoder to generate, from the transmission signal, a main path transmission signal at the assigned radio bandwidth segment for the radio transmitter to transmit and a diversity transmission signal at a different radio bandwidth segment to supply to a different radio transmitter assigned with the different radio bandwidth segment, and
a signal combiner to combine another diversity transmission signal at a second different radio bandwidth segment assigned to a second different radio transmitter and the main path transmission signal into an output transmission signal for the radio transmitter to transmit.

* * * * *